US007653014B2

United States Patent
Costo et al.

(10) Patent No.: US 7,653,014 B2
(45) Date of Patent: Jan. 26, 2010

(54) CONFIGURING A TRANSMISSION MODE BETWEEN DEVICES

(75) Inventors: Avi Costo, Haifa (IL); Gedon Rosner, Jerusalem (IL); James M. Ostrowski, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 1040 days.

(21) Appl. No.: 10/805,004

(22) Filed: Mar. 18, 2004

(65) Prior Publication Data

US 2005/0207360 A1 Sep. 22, 2005

(51) Int. Cl.
*H04B 1/44* (2006.01)
(52) U.S. Cl. .................... 370/282; 370/445
(58) Field of Classification Search .......... 370/276
See application file for complete search history.

(56) References Cited

U.S. PATENT DOCUMENTS

| 5,311,114 | A | * | 5/1994 | Sambamurthy et al. .... 370/296 |
| 5,414,700 | A | * | 5/1995 | Yang et al. .................. 370/276 |
| 5,610,903 | A | * | 3/1997 | Crayford .................... 370/213 |
| 6,178,161 | B1 | * | 1/2001 | Terry ........................ 370/276 |
| 6,457,055 | B1 | * | 9/2002 | Hwong et al. ............... 709/227 |
| 6,665,275 | B1 | * | 12/2003 | Davy et al. .................. 709/227 |
| 6,952,395 | B1 | * | 10/2005 | Manoharan et al. ......... 370/219 |
| 2002/0064155 | A1 | * | 5/2002 | Yen et al. .................... 370/390 |
| 2003/0198247 | A1 | * | 10/2003 | Gardner et al. ............. 370/445 |

OTHER PUBLICATIONS

IEEE Standard for Information Technology 802.3, 2000 Edition; Part 3: Carrier Sense Multiple Access with Collision Detection (CSMA/CD) Access Method and Physical Layer Specifications, Chapters 1-4, 21, and 28; pp. 1-82, 1-8, and 213-260, Copyright 2002 IEEE.

* cited by examiner

*Primary Examiner*—Phuc H Tran
(74) *Attorney, Agent, or Firm*—Konrad Raynes & Victor LLP; David W. Victor

(57) ABSTRACT

Provided are a method, system, and program for configuring a transmission mode between devices. A connection is established with a link partner at a common transmission speed. A duplex mode is set to a first duplex mode. A transmission error rate is monitored with the link partner and the duplex mode is changed to a second duplex mode in response to detecting that the transmission error rate exceeds a threshold.

31 Claims, 4 Drawing Sheets

CONFIGURING A TRANSMISSION MODE BETWEEN DEVICES

BACKGROUND

Ethernet devices conforming to the Institute of Electrical and Electronics Engineers ("IEEE") 802.3 standard (March, 2002) perform a configuration sequence to transmit at a highest common transmission speed between the devices and one of two transmission modes, half duplex or full duplex. In full duplex mode, data can be transmitted and received simultaneously and in half duplex mode data can only be transmitted or received separately and not simultaneously. If the stations do not configure themselves at a same duplex level, then collisions may occur and fragmented packets having (cycle redundancy code) CRC errors are received, which results in a substantial degradation of performance and transmission errors.

During configuration, devices capable of auto negotiation may advertise their transmission capabilities to allow the devices to take maximum advantage of their abilities. If both stations engage in auto negotiation, then they establish a link at the highest common speed and duplex capability. If auto negotiation is only enabled in one of the stations, then the station with auto negotiation will use parallel detection to determine the speed of the link partner and communicate at the highest common speed and set the duplex mode to half duplex. If the stations transmit at a common speed, then a link is established. However, when the station with auto negotiation transmits in its default half duplex mode, transmission errors and degradation occur if the link partner transmits at full duplex.

In certain situations, an Ethernet adapter may be programmed to transmit at a forced speed and duplex mode. In such case, if both adapters are forced to the same speed and different duplex modes, then a link is established, but substantial degradation and errors occur due to the different duplex modes. If the forced speeds are not the same, then links will not be established. If the linked stations are forced to the same speed and duplex mode, then transmissions will occur without significant errors.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
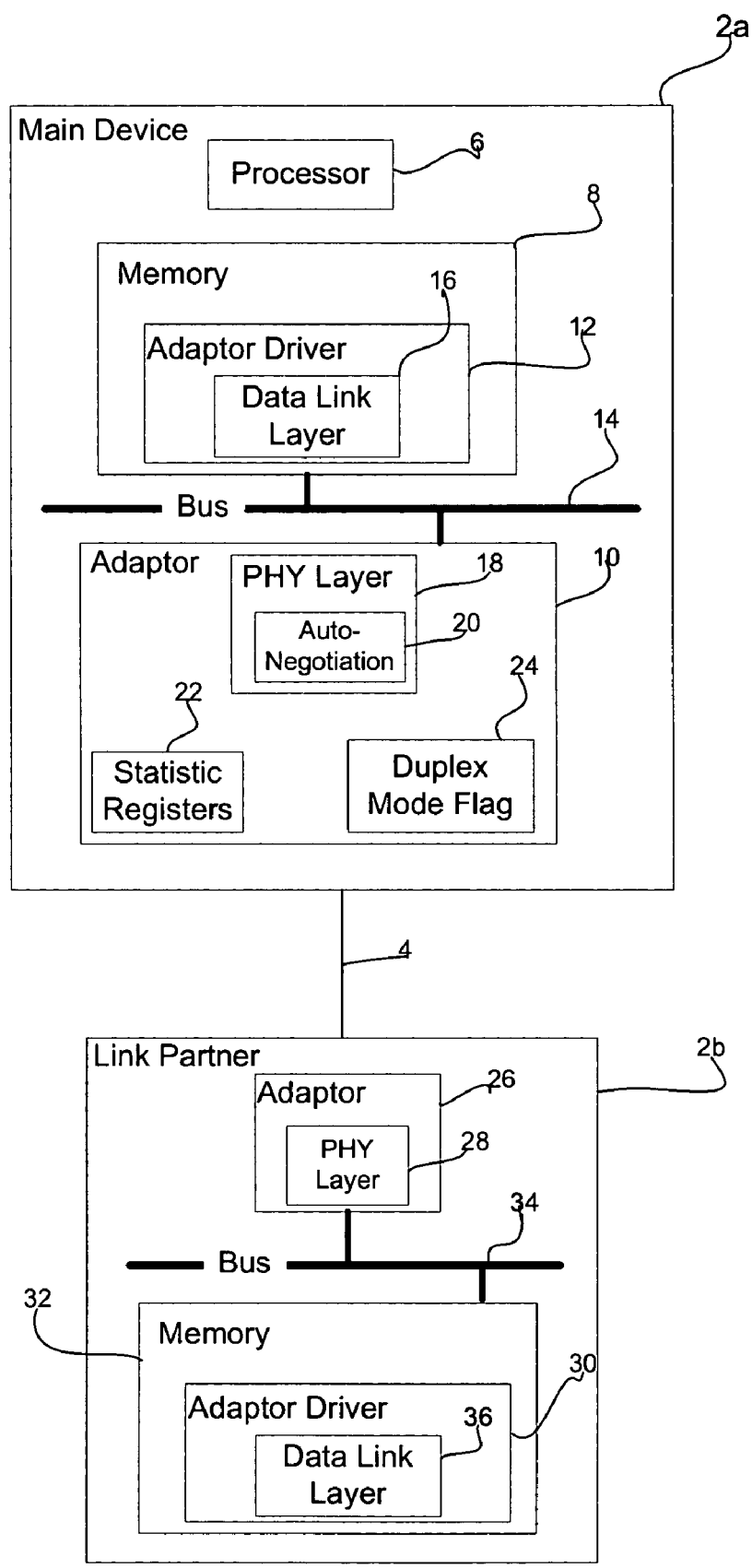
FIG. 1 illustrates a network computing environment in which embodiments are implemented.

FIG. 1 illustrates a network computing environment used with the described embodiments. A main device 2a and link partner 2b connect over a transmission line 4, which may comprise a cable consisting of one or more symmetrical metallic elements, e.g., copper, such as twisted pairs, quads, etc. The transmission line 4 may conform to the cabling standards defined in ISO/IEC 11801:1995. The connection 4 may include routers, hubs, repeaters, etc. The main device 2a includes a processor 6, which may comprise one or more central processing units (CPU), a memory 8 and is coupled to an adapter 10, such as a network interface card (NIC), to communicate over the transmission line 4. The adapter 10 may be mounted on the main device 2a motherboard, such as a Local Area Network (LAN) on Motherboard implementation, or alternatively be implemented in an expansion card that is inserted in a slot on the device 2a motherboard. An adapter device driver 12 executes in the memory 8 to provide an interface between device applications and an operating system (not shown) and the adapter 10 and performs such operations as managing interrupts, making device calls to control the adapter 10, and transmitting packets to the adapter 10. The adapter 10 and device driver 14 communicate over a bus interface 14, which may comprise bus interfaces known in the art, such as the Peripheral Component Interconnect (PCI) bus described in the publication "Conventional PCI 2.3", published by the PCI-SIG.

The adapter driver 12 includes a data link layer 14 which passes frames between a physical layer in the adapter 10 and a network layer (not shown). In Ethernet IEEE 802.3 embodiments, the data link layer 14 includes a logical link control layer and Media Access Control (MAC) sublayer. The MAC sublayer may perform such operations as framing, addressing, error detection, and contention resolution as defined in the IEEE 802.03 specification referenced above. Additional layers may also be included in the device 2a memory 8, such as a transport layer, network layer, etc.

The adapter 10 implements a physical layer device (PHY) layer 18, which handles the physical signaling and includes an auto-negotiation function 20 to perform auto-negotiation operations to detect a link speed of the link partner and perform the parallel detection operation to detect the link speed for link partner devices that do not include auto-negotiation, such as 10BASE-T, 100BASE-TX, and 100BASE-T4 compatible devices. The adapter 10 includes registers in the adapter 10 hardware, including error statistic registers 22 indicating bits received with errors to allow a computation of the bit error ratio of bits transferred and a duplex mode flag 24 instructing the hardware to operate in either full duplex or half duplex mode, regardless of the setting specified by the adapter driver 12.

The linked partner device 2a also includes an adapter 26 having a PHY layer 28 that interfaces with an adapter driver 30 executing in memory 32 via a bus interface 34. The adapter driver 30 includes a data link layer 36 In IEEE 802.3 embodiments, the data link layer 36 may include a link layer control sublayer and MAC sublayer, similar to that of adapter driver 12. In certain embodiments, the linked partner device 2a does not implement auto-negotiation and transmits at a forced link speed, such as 10 Mb or 100 Mb, and may be set to either half or full duplex mode.

Figure 2:
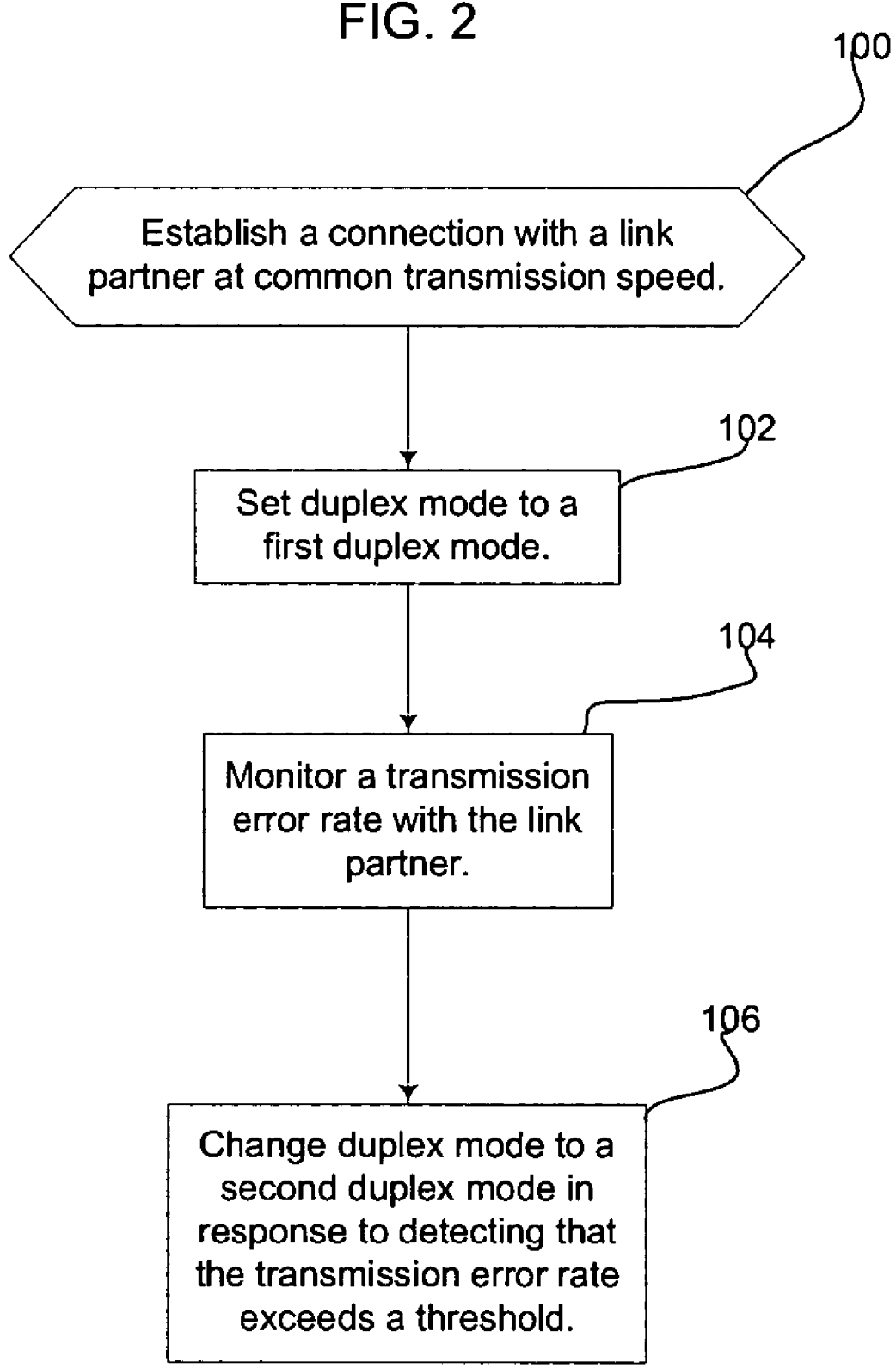
FIGS. 2, 3, 4, and 5 illustrate operations to establish a link between an adapter and a link partner in accordance with embodiments
Figure 4:
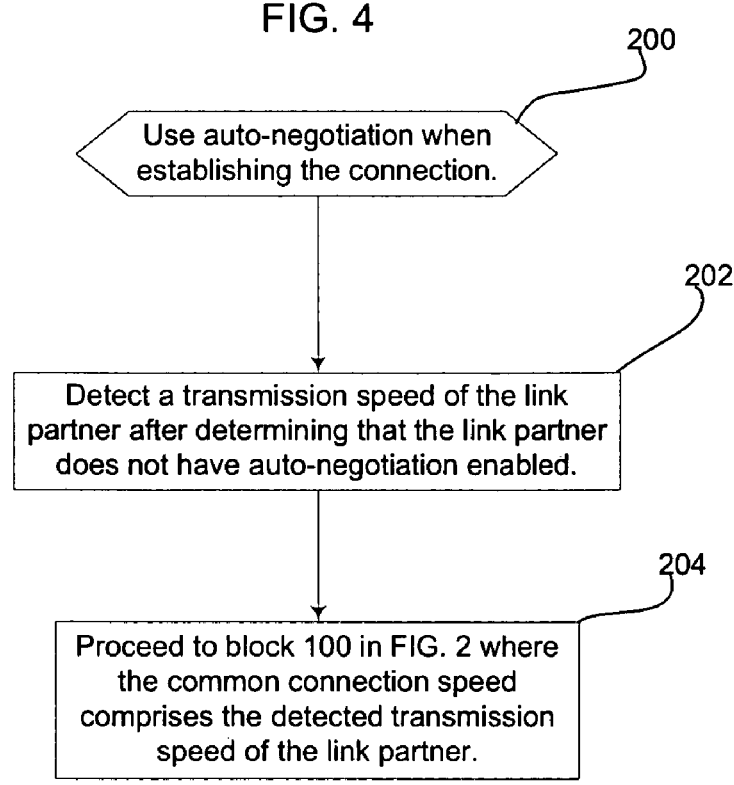
Figure 5:
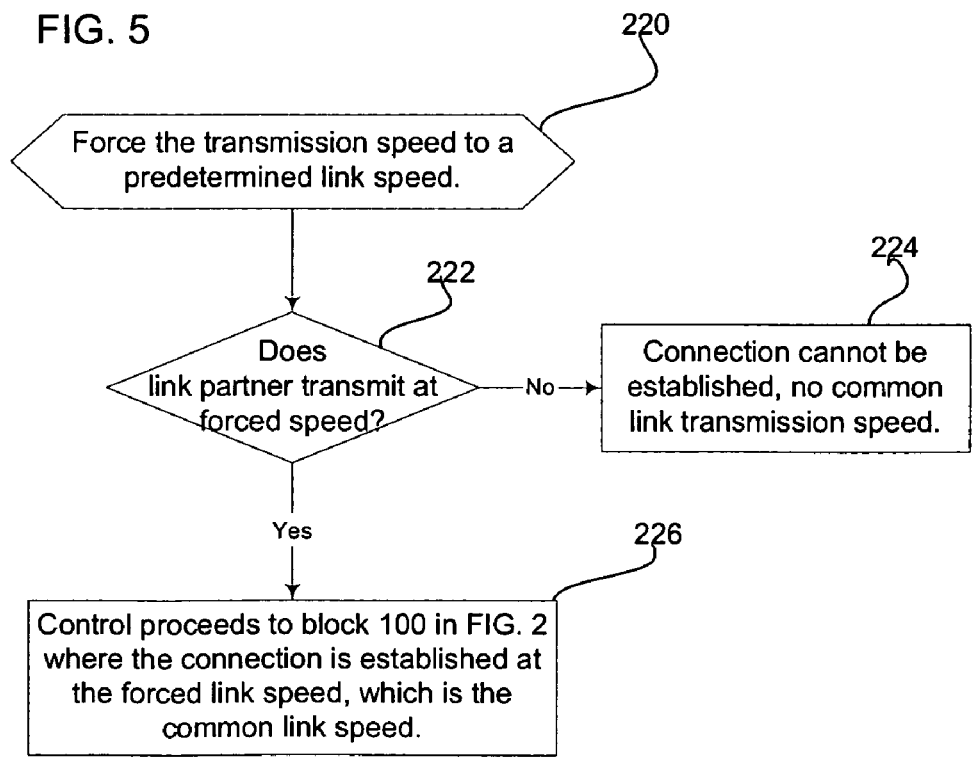

FIG. 2 illustrates operations performed in the data link layer 16 of the main device 2a to establish a connection with the link partner 2b. Control begins at block 100 with the adapter 10 establishing a connection with a link partner at common transmission speed. FIGS. 4 and 5 illustrate additional details of establishing a connection in the event that the adapter 10 has auto-negotiation enabled or is forced to transmit at a certain fixed speed. In certain embodiments, the link partner 2b adapter 26 does not have auto-negotiation enabled and transmits at a forced speed, thus forcing the auto-negotiation function 20 in the adapter 10 to use parallel detection to determine the forced speed at which the adapter 26 transmits. If the parallel detection function of the auto-negotiation 20 can establish a connection at a common speed, then the data link layer 16 sets (at block 102) a duplex mode to a first duplex mode. In certain embodiments, the first duplex mode comprises full duplex so that the data link layer 16 attempts to initially transmit using the best performing duplex mode. In alternative embodiments, the first duplex mode may comprise half-duplex.

The data link layer 16 monitors (at block 104) a transmission error rate with the link partner, such as a transmission error rate indicating a ratio of bits transmitted in error, i.e., receive and/or transmit errors, to a total number of transmitted bits. The transmission error rate may comprise receive and/or transmit errors. The transmission error rate may be measured and tested within a specified time window. In certain embodiments, such as IEEE 802.3 implementations, a transmission error rate of less than $10^{-9}$ is acceptable. The data link layer 16 may obtain transmission error rate information from statistic registers 22 in the adapter 10 hardware that are set by the PHY layer 18. The data link layer 16 may change (at block 106) the duplex mode to a second duplex mode, such as half duplex or alternatively full duplex, in response to detecting that the transmission error rate exceeds a threshold, which indicates an excessive number of collisions due to a mismatch of duplex modes between the main device 2a and the link partner 2b. If the determined error rate is not excessive beyond a predetermined threshold, then the adapter 10 continues transmitting at the first duplex mode, such as full duplex or half duplex. In certain embodiments, the duplex mode is changed from a first to second mode without terminating the connection with the link partner.

In additional embodiments, even after switching the duplex mode from a first to second duplex mode, the adapter 10 may continually monitor the transmission error rate and again switch duplex modes if the error rate exceeds a predetermined threshold. In still further embodiments, the adapter 10 may increase the error rate threshold in subsequent checks to determine whether to again switch the duplex mode.

Figure 3:
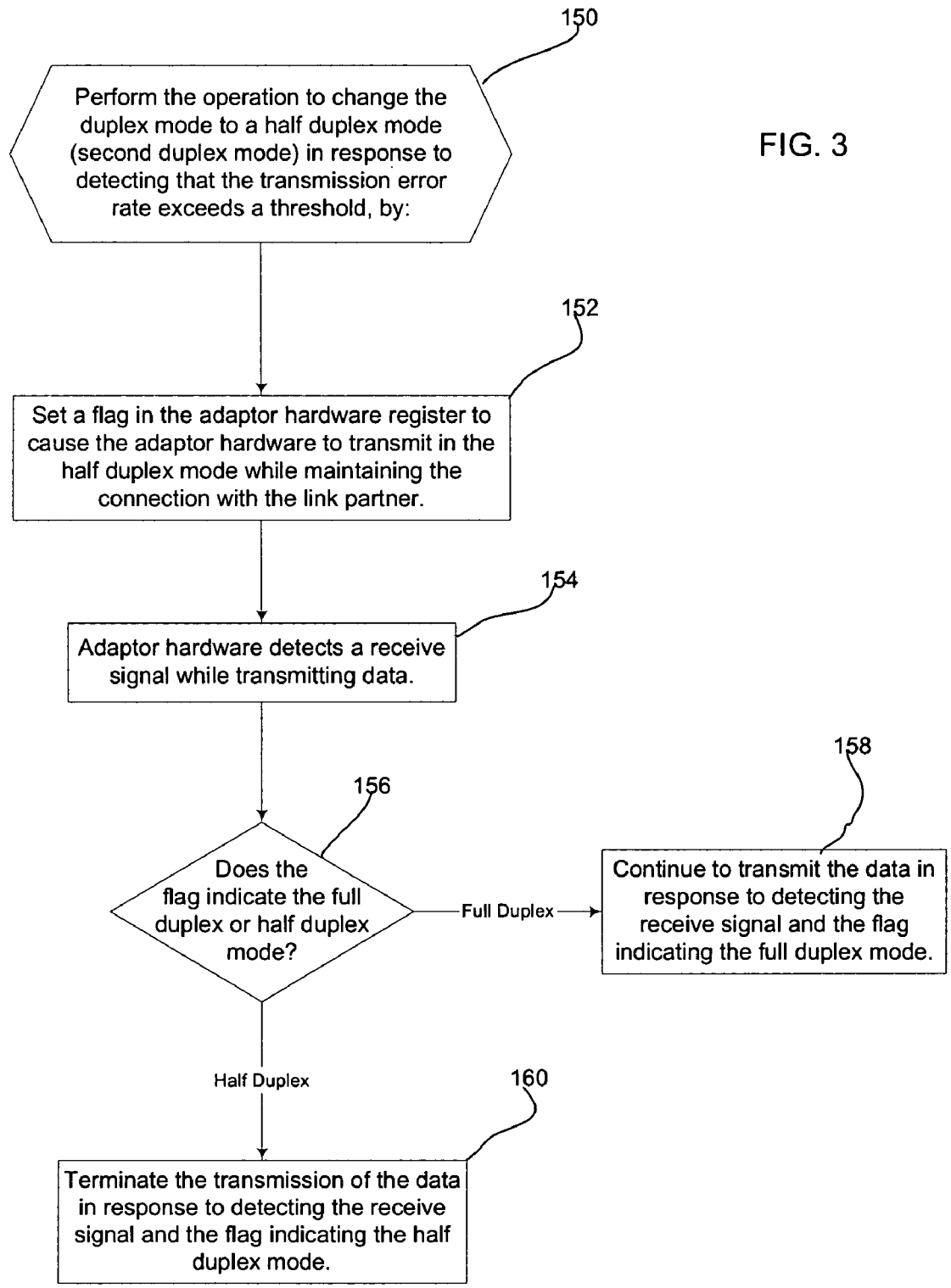

FIG. 3 illustrates an embodiment to change the duplex mode, such as performed at block 106, without terminating the connection with the link partner 2b. Control begins at block 150 upon determining to change the duplex mode in response to determining a transmission error rate, such as a bit error ratio, that exceeds the predetermined threshold. The data link layer 16 sets (at block 152) a flag, such as the duplex mode flag 24, in the adapter hardware registers to cause the adapter hardware, such as the PHY layer 18, to transmit in the half duplex mode while maintaining the connection with the link partner 2b. Subsequently, the adapter 10 hardware, such as the PHY layer 18, detects (at block 154) a receive signal while transmitting data, which may be in the form of packets. The receive signal indicates another device is attempting to transmit, which requires collision handling. If (at block 156) the flag, such as the duplex mode flag 24, indicates full duplex, then the PHY layer 18 continues to transmit (at block 158) the data in response to detecting the receive signal and the flag 24 indicating the full duplex mode. Otherwise, if the flag 24 indicates half duplex mode, then the PHY layer 18 terminates (at block 160) the transmission of the data in response to detecting the receive signal and the flag indicating the half duplex mode. The PHY layer 18 may then retry the transmission later until successful or a maximum number of attempts have been made and all terminated due to continued collisions.

With the embodiment of FIG. 3, the data link layer 16 affects a change in the duplex mode without causing a termination in the connection to the link partner 2b by changing a hardware setting, i.e., the duplex mode flag 24, that the PHY layer 18 checks before determining whether to handle a collision in full or half duplex mode.

FIG. 4 illustrates operations the data link layer 16 performs in the situation where the main device adapter 10 implements auto-negotiation 20 and is connected to a link partner forced to a predetermined speed, such as 10 Mb or 100 Mb. The adapter 10 begins by using (at block 200) auto-negotiation to establish the connection. The auto-negotiation function 20 detects (at block 202) the transmission speed of the link partner in response to determining that the link partner does not have auto-negotiation enabled. In certain embodiments, a parallel detection algorithm in the auto-negotiation function 20 may be used to determine the link speed when the link partner 2b does not have auto-negotiation enabled. Control then proceeds (at block 204) to block 100 in FIG. 2 where the common connection speed comprises the detected transmission speed of the link partner. If the devices do not transmit at a common transmission speed, then a link is not established.

FIG. 5 illustrates operations the data link layer 16 performs in the situation where the main device adapter 10 is forced to a predetermined transmission speed and does not use auto-negotiation. The adapter 10 begins by forcing (at block 220) the transmission speed to a fixed speed. If (at block 222) the link partner adapter 26 does not transmit at the same fixed transmission speed, then the connection cannot be established (at block 224). If the link partner 26 and main device adapter 18 transmit at a common link speed, then control proceeds (at block 226) to block 100 in FIG. 2 where the connection is established at the forced link speed, which is the common link speed.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described embodiments, the data link layer 16 was shown as implemented as software executing in system memory. In alternative embodiments, the data link layer 16 may be implemented in the adapter hardware and communicate with the PHY layer in the adapter hardware. Additionally, certain components of the data link layer, such as the logical link control is implemented in the adapter driver and the MAC sublayer is implemented in the adapter hardware.

In the described embodiments, the data link layer operates over a copper media. In alternative embodiments, the transmission line may comprise media other than copper, such as a wireless transmission medium, optical wires, etc.

The illustrated operations of FIGS. 2, 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method implemented in a computer system having an adaptor, comprising:
    establishing a connection between the adaptor and a link partner at a common transmission speed;
    setting a duplex mode used for the adaptor transmissions to a first duplex mode;
    monitoring a transmission error rate between the adaptor and the link partner;
    changing the duplex mode to a second duplex mode in response to detecting that the transmission error rate exceeds a threshold;
    continuing to monitor the transmission error rate between the adaptor and the link partner after changing the duplex mode; and
    changing the duplex mode from one of the first to second duplex mode or from the second to first duplex mode in response to detecting that the transmission error rate exceeds the threshold.

2. The method of claim 1, wherein the duplex mode is changed without terminating the connection with the link partner.

3. The method of claim 1, wherein the first duplex mode comprises full duplex and the second duplex mode comprises half duplex.

4. The method of claim 1, wherein the first duplex mode comprises half duplex and the second duplex mode comprises full duplex.

5. The method of claim 1, wherein the duplex mode is changed to the second duplex mode by:
    setting a flag in a hardware register to cause the hardware to transmit in the second duplex mode while maintaining the connection with the link partner.

6. The method of claim 5, wherein the first duplex mode comprises full duplex and the second duplex mode comprises half duplex, and wherein the hardware switches to the half duplex mode in response to the flag being set by:
    detecting a receive signal while transmitting data;
    continuing to transmit the data in response to detecting the receive signal and the flag indicating the full duplex mode; and
    terminating the transmission of the data in response to detecting the receive signal and the flag indicating the half duplex mode.

7. The method of claim 1, further comprising:
    using auto-negotiation when establishing the connection; and
    detecting a transmission speed of the link partner after determining that the link partner does not have auto-negotiation enabled, wherein the common connection speed comprises the detected transmission speed of the link partner.

8. The method of claim 1, further comprising:
    forcing the transmission speed to a predetermined link speed, wherein the connection is established if the link partner transmits at the predetermined link speed.

9. The method of claim 1, wherein the monitored transmission error rate comprises a bit error ratio of a number of bits received in error to a total number of bits received within a predefined time window.

10. A system in communication with a link partner, comprising:
    an adapter;
    a data link layer in communication with the adapter, wherein the data link layer is operable to:
        establish a connection between the adapter and the link partner at a common transmission speed;
        set a duplex mode at which the adapter transmits data to a first duplex mode;
        monitor a transmission error rate with the link partner;
        change the duplex mode to a second duplex mode in response to detecting that the transmission error rate exceeds a threshold;
        continue to monitor the transmission error rate with the link partner after changing the duplex mode; and
        change the duplex mode from one of the first to second duplex mode or from the second to first duplex mode in response to detecting that the transmission error rate exceeds the threshold.

11. The system of claim 10, wherein the duplex mode is changed without terminating the connection with the link partner.

12. The system of claim 10, wherein the first duplex mode comprises full duplex and the second duplex mode comprises half duplex.

13. The system of claim 10, wherein the first duplex mode comprises half duplex and the second duplex mode comprises full duplex.

14. The system of claim 10, wherein the duplex mode is changed to the second duplex mode by:
    setting a flag in an adapter register to cause the adapter to transmit in the second duplex mode while maintaining the connection with the link partner.

15. The system of claim 10, wherein the first duplex mode comprises full duplex and the second duplex mode comprises half duplex, and wherein the adapter switches to the half duplex mode in response to the flag being set by:
    detecting a receive signal while transmitting data;

continuing to transmit the data in response to detecting the receive signal and the flag indicating the full duplex mode; and terminating the transmission of the data in response to detecting the receive signal and the flag indicating the half duplex mode.

16. The system of claim 10, wherein the adapter is operable to perform:

use auto-negotiation when establishing the connection; and detect a transmission speed of the link partner after determining that the link partner does not have auto-negotiation enabled, wherein the common connection speed comprises the detected transmission speed of the link partner.

17. The system of claim 10, wherein the adapter is further operable to perform:

force the transmission speed to a predetermined link speed, wherein the connection is established if the link partner transmits at the predetermined link speed.

18. The system of claim 10, wherein the monitored transmission error rate comprises a bit error ratio of a number of bits received in error to a total number of bits received within a predefined time window.

19. The system of claim 10, further comprising:

a processor; and a software driver implementing the data link layer executed by the processor.

20. The system of claim 10, wherein the data link layer is implemented in the adapter.

21. A system in communication with a link partner, comprising:

a processor;

an adapter;

a data link layer execute by the processor in communication with the adapter, wherein the data link is operable to:

establish a connection between the adapter and the link partner at a common transmission speed;

set a duplex mode at which the adapter transmits to a first duplex mode;

monitor a transmission error rate with the link partner;

change the duplex mode to a second duplex mode in response to detecting that the transmission error rate exceeds a threshold;

continue to monitor the transmission error rate with the link partner after changing the duplex mode; and change the duplex mode from one of the first to second duplex mode or from the second to first duplex mode in response to detecting that the transmission error rate exceeds the threshold.

22. The system of claim 21, wherein the duplex mode is changed without terminating the connection with the link partner.

23. An article of manufacture comprising a computer readable storage medium including code executed to control an adaptor in communication with a link partner and initiate operations, the operations comprising:

establish a connection between the adaptor and the link partner at a common transmission speed;

set a duplex mode used for the adaptor transmissions to a first duplex mode;

monitor a transmission error rate between the adaptor and the link partner;

change the duplex mode to a second duplex mode in response to detecting that the transmission error rate exceeds a threshold;

continue to monitor the transmission error rate with the link partner after changing the duplex mode; and change the duplex mode from one of the first to second duplex mode or from the second to first duplex mode in response to detecting that the transmission error rate exceeds the threshold.

24. The article of manufacture of claim 23, wherein the duplex mode is changed without terminating the connection with the link partner.

25. The article of manufacture of claim 23, wherein the first duplex mode comprises full duplex and the second duplex mode comprises half duplex.

26. The article of manufacture of claim 23, wherein the first duplex mode comprises half duplex and the second duplex mode comprises full duplex.

27. The article of manufacture of claim 23, wherein the duplex mode is changed to the second duplex mode by:

setting a flag in a hardware register to cause the hardware to transmit in the second duplex mode while maintaining the connection with the link partner.

28. The article of manufacture of claim 27, wherein the first duplex mode comprises full duplex and the second duplex mode comprises half duplex, and wherein the hardware switches to the half duplex mode in response to the flag being set by:

detecting a receive signal while transmitting data;

continuing to transmit the data in response to detecting the receive signal and the flag indicating the full duplex mode; and terminating the transmission of the data in response to detecting the receive signal and the flag indicating the half duplex mode.

29. The article of manufacture of claim 23, wherein the operations further comprise:

initiating auto-negotiation when establishing the connection; and detecting a transmission speed of the link partner after determining that the link partner does not have auto-negotiation enabled, wherein the common connection speed comprises the detected transmission speed of the link partner.

30. The article of manufacture of claim 23, wherein the operations further comprise:

forcing the transmission speed to a predetermined link speed, wherein the connection is established if the link partner transmits at the predetermined link speed.

31. The article of manufacture of claim 23, wherein the monitored transmission error rate comprises a bit error ratio of a number of bits received in error to a total number of bits received within a predefined time window.

* * * * *